United States Patent
Zhang et al.

(10) Patent No.: US 9,300,545 B2
(45) Date of Patent: Mar. 29, 2016

(54) PAGE LAYOUT IN A FLOW VISUALIZATION

(75) Inventors: Fenghui Zhang, Redmond, WA (US); Lik Mui, Hayward, CA (US); Peng Li, Bellevue, WA (US); Lin Liao, Bothell, WA (US); Zhiting Xu, Redmond, WA (US)

(73) Assignee: Google Inc., Mountain View, CA (US)

( * ) Notice: Subject to any disclaimer, the term of this patent is extended or adjusted under 35 U.S.C. 154(b) by 1051 days.

(21) Appl. No.: 13/271,199

(22) Filed: Oct. 11, 2011

(65) Prior Publication Data

US 2013/0091270 A1    Apr. 11, 2013

(51) Int. Cl.
*H04L 12/24* (2006.01)
*G06Q 30/02* (2012.01)
*H04L 12/26* (2006.01)

(52) U.S. Cl.
CPC ............... *H04L 41/22* (2013.01); *G06Q 30/02* (2013.01); *H04L 43/0876* (2013.01)

(58) Field of Classification Search
CPC ........................... H04L 41/22; H04L 43/0876
USPC ........................................................ 709/224
See application file for complete search history.

(56) References Cited

U.S. PATENT DOCUMENTS

| | | | |
|---|---|---|---|
| 5,751,956 A | 5/1998 | Kirsch | |
| 5,870,559 A | 2/1999 | Leshem et al. | |
| 6,275,862 B1 | 8/2001 | Sharma et al. | |
| 6,308,210 B1 | 10/2001 | Fields et al. | |
| 6,549,944 B1 | 4/2003 | Weinberg et al. | |
| 6,647,381 B1 | 11/2003 | Li et al. | |
| 6,741,967 B1 * | 5/2004 | Wu et al. | 705/7.32 |
| 6,781,599 B2 | 8/2004 | Abello et al. | |
| 6,981,037 B1 | 12/2005 | Srikant et al. | |
| 7,035,926 B1 | 4/2006 | Cohen et al. | |
| 7,043,702 B2 | 5/2006 | Chi et al. | |
| 7,103,838 B1 | 9/2006 | Krishnamurthy et al. | |
| 7,165,105 B2 | 1/2007 | Reiner et al. | |
| 7,219,300 B2 | 5/2007 | Arquie et al. | |
| 7,305,622 B2 | 12/2007 | Cohen et al. | |
| 7,596,716 B2 | 9/2009 | Frost et al. | |
| 7,644,375 B1 | 1/2010 | Anderson et al. | |
| 7,676,465 B2 | 3/2010 | Poola | |
| 7,707,229 B2 | 4/2010 | Tiyyagura | |
| 7,792,843 B2 | 9/2010 | Iverson | |
| 7,792,844 B2 | 9/2010 | Error et al. | |
| 7,917,382 B2 | 3/2011 | Cereghini et al. | |
| 7,958,189 B2 | 6/2011 | Bernstein | |
| 8,010,657 B2 | 8/2011 | Hall et al. | |

(Continued)

FOREIGN PATENT DOCUMENTS

| | | |
|---|---|---|
| KR | 10-2003-0088636 | 11/2003 |
| WO | WO-01/57706 | 8/2001 |
| WO | WO-2004/003701 | 1/2004 |

OTHER PUBLICATIONS

US Notice of Allowance on U.S. Appl. No. 13/271,191 DTD Nov. 25, 2013, 13 pages.

(Continued)

*Primary Examiner* — Luat Phung
*Assistant Examiner* — Saad A Waqas
(74) *Attorney, Agent, or Firm* — Foley & Lardner LLP; John D. Lanza

(57) ABSTRACT

Systems and methods for generating a flow visualization of network traffic. A scoring function is used to prioritize which traffic paths are displayed in the visualization.

20 Claims, 6 Drawing Sheets

(56) References Cited

U.S. PATENT DOCUMENTS

| | | | |
|---|---|---|---|
| 8,065,300 | B2 | 11/2011 | Gupta et al. |
| 8,332,371 | B1 | 12/2012 | Brin |
| 2001/0020238 | A1 | 9/2001 | Tsuda |
| 2002/0147805 | A1 | 10/2002 | Leshem et al. |
| 2003/0023715 | A1 | 1/2003 | Reiner et al. |
| 2003/0115333 | A1* | 6/2003 | Cohen et al. .................. 709/227 |
| 2003/0131097 | A1 | 7/2003 | Kasriel et al. |
| 2004/0059746 | A1 | 3/2004 | Error et al. |
| 2004/0174397 | A1* | 9/2004 | Cereghini et al. ............. 345/855 |
| 2004/0196311 | A1 | 10/2004 | Cadez et al. |
| 2004/0267961 | A1 | 12/2004 | Dietz et al. |
| 2005/0203902 | A1 | 9/2005 | Davis et al. |
| 2006/0149728 | A1* | 7/2006 | Error et al. ........................ 707/5 |
| 2006/0242145 | A1 | 10/2006 | Krishnamurthy et al. |
| 2006/0242292 | A1* | 10/2006 | Carter ........................... 709/224 |
| 2006/0277212 | A1 | 12/2006 | Error |
| 2007/0112730 | A1 | 5/2007 | Gulli et al. |
| 2007/0280113 | A1 | 12/2007 | Ninan et al. |
| 2008/0181463 | A1 | 7/2008 | Error |
| 2008/0201357 | A1* | 8/2008 | Error et al. .................... 707/102 |
| 2009/0070366 | A1 | 3/2009 | Zhao et al. |
| 2009/0083421 | A1 | 3/2009 | Glommen et al. |
| 2010/0228731 | A1 | 9/2010 | Gollapudi |
| 2010/0251128 | A1 | 9/2010 | Cordasco |
| 2010/0257024 | A1 | 10/2010 | Holmes et al. |
| 2011/0055710 | A1 | 3/2011 | Kirkby et al. |
| 2011/0167063 | A1 | 7/2011 | Tengli et al. |
| 2012/0047180 | A1 | 2/2012 | Kirshenbaum |
| 2012/0124030 | A1* | 5/2012 | Seetharama et al. .......... 707/716 |
| 2012/0158496 | A1 | 6/2012 | Solomon et al. |
| 2012/0201170 | A1 | 8/2012 | Sofman et al. |
| 2012/0290920 | A1 | 11/2012 | Crossley |
| 2013/0091270 | A1 | 4/2013 | Zhang et al. |

OTHER PUBLICATIONS

US Office Action on U.S. Appl. No. 13/271,222 DTD Dec. 31, 2013, 30 pages.

US Office Action on U.S. Appl. No. 13/271,214 DTD Dec. 20, 2012, 14 pages.

Coremetrics—IBM WebSphere Portal Analytics, Best Practices Overview, Aug. 2009, 20 pages.

Cunningham et al, TrafficFlow: Visualizing User Sessions, Stanford University, URL: https://graphics.stanford.edu/wikis/cs448b-09-fall/FPIPP-CunninghamBen-MacDougallDaniel?action=AttachFile&do=get&target=trafficflow.pdf, 8 pages.

Data Visualization, Stanford University, URL https://graphics.stanford.edu/wikis/cs448b-09-fall/FPIPP-CunninghamBen-MacDougallDaniel; retrieved from internet on Sep. 22, 2011; 11 pages.

IBM Coremetrics Web Analytics User Guide, Jun. 15, 2011, 122 pages.

Li et al., Entropy-Based Criterion in Categorical Clustering, Proceedings of the 21st International Conference on Machine Learning, Banff, Canada, 2004, 8 pages.

Mathieu et al., Local Structure in the Web, WWW2003 Poster Template, http://www.2003.org/cdrom/papers/poster/p102/p102-mathieu.htm, 4 pages.

Metronome Labs, Products::Metronome Explain, Mar. 27, 2010, 2 pages.

Title Lockdown Media, Source http://netscale.cse.nd.edu/ URL: http://netscale.cse.nd.edu/twiki/bin/view/Main/LockdownMedia.

Title: Unica Netinsight, Source Unica.com URL http://www.unica.com/documents/us/Unica_ProSheet_NetInsight_1209.pdf.

US Notice of Allowance on U.S. Appl. No. 13/271,214 DTD Nov. 4, 2013.

US Notice of Allowance on U.S. Appl. No. 13/271,214 DTD Sep. 16, 2013.

US Office Action on U.S. Appl. No. 13/271,188 DTD Oct. 25, 2013.

US Office Action on U.S. Appl. No. 13/271,188 DTD May 13, 2013.

US Office Action on U.S. Appl. No. 13/271,222 DTD Jul. 16, 2013.

US Office Action on U.S. Appl. No. 13/271,191 DTD Jun. 19, 2013.

US Office Action on U.S. Appl. No. 13/271,214 DTD Jun. 3, 2013.

Visual Sciences: Path Analysis using Path Browser, Source http://webanalyticssimplified.blogspot.com/ URL: http://webanalyticssimplified.blogspot.com/2009/12/visual010sciencespath010analysis010using.html Date: Dec. 28, 2009.

International Preliminary Report on Patentability mailed Apr. 24, 2014 in PCT Application No. PCT/US2012/059569.

US Notice of Allowance on U.S. Appl. No. 13/271,188 DTD Jun. 19, 2014, 23 pages.

US Notice of Allowance on U.S. Appl. No. 13/271,191 DTD Feb. 18, 2014, 8 pages.

Howard, Jennifer, "Citation by Citation, New Maps Chart Hot Research and Scholarship's Hidden Terrain", The Chronicle, Sep. 11, 2011, 8 pages.

D. Edler & M. Rosvall (2010), Load and Simplify Network, Alluvial Generator, printed on Nov. 8, 2011, retrieved from internet URL: www.mapequation.org/alluvialgenerator/index.html, 6 pages.

Mapping Science, Eigenfactor.org, printed on Nov. 9, 2011, retrieved from internet URL: http://www.eigenfactor.org/map, 1 page.

Overview, Eigenfactor.org, printed on Nov. 9, 2011, retrieved from internet URL: http://www.eigenfactor.org/methods.php, 1 page.

Psychological Bulletin (1997), Eigenfactor.org, retrieved from internet URL: http://well-formed.eigenfactor.org/img/shots/change_02.png, 1 page.

Rosvall et al., Mapping Change in Large Networks. PLoS ONE, Jan. 27, 2010, 13 pages.

PCT/US/20120059569 International Search Report/Written Opionion, dated Mar. 19, 2013, 8 pgs.

US Office Action on U.S. Appl. No. 13/271,189 mailed Oct. 3, 2014, 10 pages.

US Notice of Allowance on U.S. Appl. No. 13/271,222 DTD Feb. 13, 2015, 17 pgs.

* cited by examiner

PAGE LAYOUT IN A FLOW VISUALIZATION

BACKGROUND

The Internet provides access to a wide variety of content. For instance, images, audio, video, and web pages for many different topics are accessible through the Internet. The accessible content provides an opportunity to present advertisements to users. Advertisements can be placed within content, such as a web page, image or video, or the content can trigger the display of one or more advertisements, such as presenting an advertisement in an advertisement slot within the content and/or in an advertisement slot of a pop-up window or other overlay.

The amount of traffic information available regarding even a basic Internet transaction can be cumbersome for interested parties. Users may visit numerous, different uniform resource locators (URLs), to complete substantially the same types of transactions. For example, an advertiser may wish to know more about the number of users that actually add a product to an online shopping cart. However, a unique URL may be generated each time a user adds a product to a shopping cart. In addition, various parties may be interested in how users arrive at certain webpages. For example, one user may perform an Internet search for a specific product, while another user may follow an advertisement link, to arrive at the same product description page. Therefore, the number of traffic paths that users may follow may also be large. For these and other reasons, generating visualizations of the flow of Internet traffic is challenging and difficult.

SUMMARY

In general, one innovative aspect of the subject matter described in this specification can be embodied in a method of displaying Internet traffic data. The method includes retrieving, from a memory, data representative of nodes and traffic paths between nodes. The method includes determining a level for each node, the level representing a position of a node relative to a start node. The method includes calculating, by a processing circuit, a score for each traffic path based in part on a traffic volume along a traffic path and a level difference between nodes connected by the traffic path. The method includes determining, by the processing circuit, an arrangement of nodes that has a higher sum of scores for the traffic paths. The method includes generating visualization data configured to cause an electronic display to display two or more of the nodes and one or more traffic paths between the displayed nodes, based in part on the determined arrangement of nodes. The method includes providing the visualization data to an electronic device.

In another implementation, a system for generating a visualization of network traffic includes a processing circuit configured to retrieve data representative of nodes and traffic paths between nodes. The processing circuit is configured to determine a level for each node, the level representing a position of a node relative to a start node. The processing circuit is configured to calculate a score for each traffic path based in part on the volume of traffic along a traffic path and a level difference between nodes connected by the traffic path. The processing circuit is further configured to determine an arrangement of nodes that has a higher sum of scores for the traffic paths. The processing circuit is configured to generate visualization data configured to cause an electronic display to display two or more of the nodes and one or more traffic paths between the displayed nodes, based in part on the determined arrangement of nodes. The processing circuit is configured to provide the visualization data to an electronic device.

A further implementation is one or more computer-readable media having instructions stored therein. The instructions are executable by one or more processors to cause the one or more processors to perform operations. The operations include retrieving data representative of nodes and traffic paths between nodes. The operations include determining a level for each node, the level representing a position of a node relative to a start node. The operations include calculating a score for each traffic path based in part on a traffic volume along a traffic path and a level difference between nodes connected by the traffic path. The operations include determining an arrangement of nodes that has a higher sum of scores for the traffic paths. The operations include generating visualization data configured to cause an electronic display to display two or more of the nodes and one or more traffic paths between the displayed nodes, based in part on the determined arrangement of nodes. The operations also include providing the visualization data to an electronic device.

These implementations are mentioned not to limit the scope of the disclosure, but to provide examples to aid in the understanding thereof. Particular implementations can be developed to realize one or more of the following advantages.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
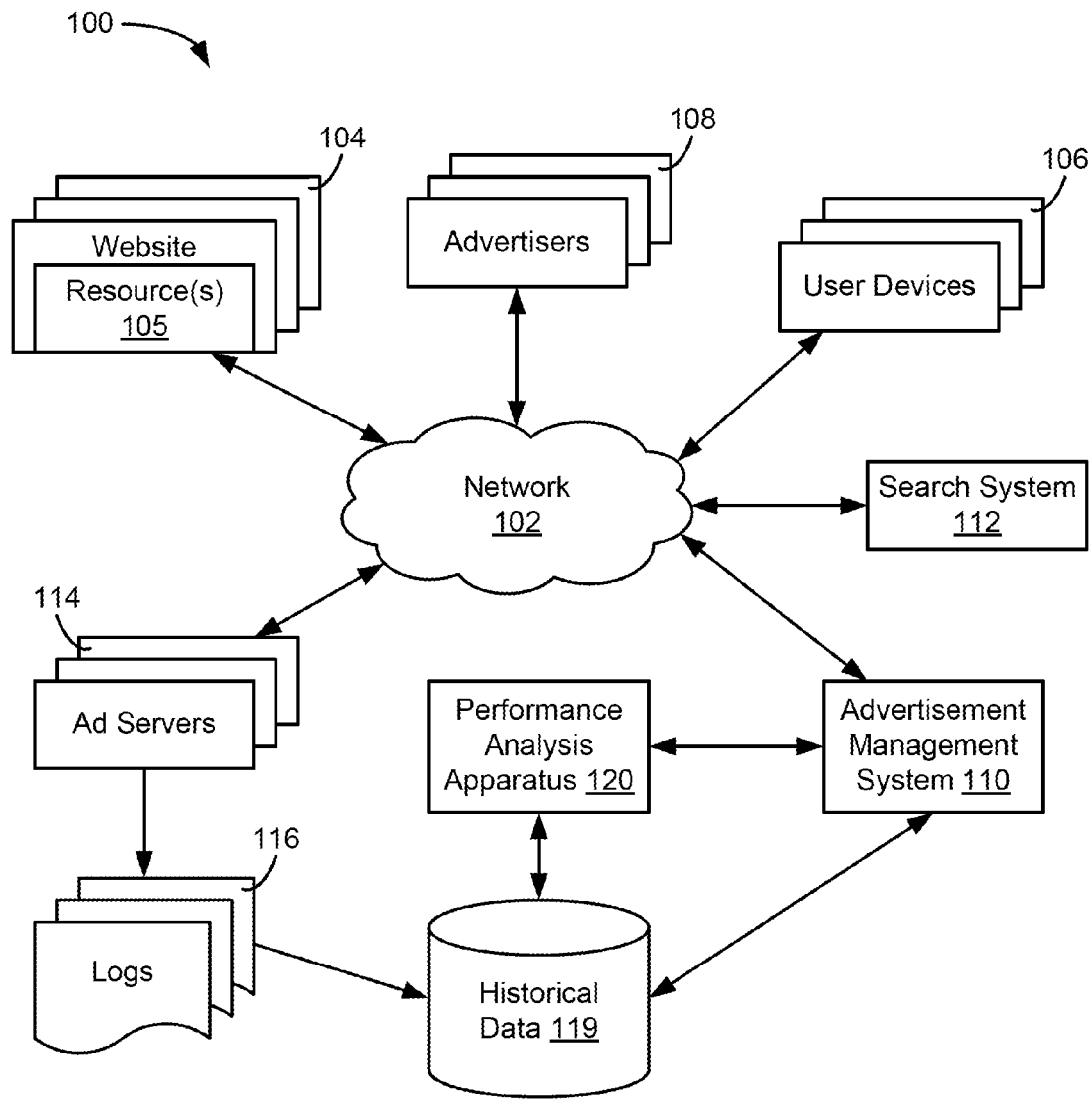
FIG. 1 is a block diagram of an example environment in which an advertisement management system manages advertising services in accordance with an illustrative embodiment.

The flow of Internet traffic is an important metric for website owners, advertisers, and other interested parties. For example, traffic data may include information as to how a user arrives at a website (e.g., by starting their web browsing at the website, by following a hyperlink from another website, etc.), how a user navigates within the website (e.g., by traversing from a product information page to a shopping cart page, by traversing from a shopping cart page to a purchase page, etc.), and where users go after visiting the website (e.g., by clicking on advertisements, by navigating to other websites, etc.). Interested parties can use traffic information to make changes to the website, tailor an advertising campaign a certain way, and perform other functions.

Interested parties (e.g., advertisers, website administrators, and other parties) may access various reports and visualizations that convey information regarding user interactions with the content and the flow of traffic through certain websites. A traffic analysis tool may aggregate and display traffic data, to assist an interested party in discerning how users interact with various webpages. For example, an advertiser may wish to know the percentage of users that actually click on an advertisement or how many users actually complete a purchase of the advertised product. The analysis and reporting of the traffic data can enable an advertiser to make advertising budget allocation decisions. In another example, a website administrator may make changes to the website that lead to a greater number of users reaching certain pages of a website.

In particular, the analysis tool may operate to simplify the presentation of information to an interested party about the flow of traffic. To do so, the analysis tool may aggregate and group certain types of information into "nodes" in the visualization. In some implementations, displayed nodes may be "clusters" of aggregated URLs. For example, URLs associated with viewing a shopping cart may be aggregated into a single cluster for display on a traffic flow visualization. In another example, other types of URLs within a particular website may be clustered (e.g., a main page, a search page, etc.) and the traffic between these URLs may also be aggregated. URL clustering is described in greater detail in the co-filed U.S. patent application entitled, "Automatic Approach to Web Page Grouping Based on URLs," which is hereby incorporated by reference. In further implementations, other types of information can similarly be aggregated and grouped into nodes for a traffic flow visualization (e.g., demographic information, geographic location information, information about the hardware or software used to access websites, etc.).

The analysis tool may also automatically determine which nodes and flows of traffic are displayed in a visualization, according to various implementations. Aggregated flows of traffic among nodes may still be difficult to follow for a user of the visualization. For example, traffic may flow from node A to node D by traversing both nodes B and C. Traffic may also traverse from node A to node C and on to node D. Some traffic may flow directly from node A to node D. In addition, some traffic may follow a backwards path (e.g., by arriving at a previous node). For example, a user may traverse from node B to node C and then choose to return to node B, before continuing on to node D. In some implementations, the analysis tool may use a scoring function to determine whether or not certain paths of traffic are displayed in a traffic flow visualization.

FIG. 1 is a block diagram of an example environment 100 in which an advertisement management system manages advertising services. Environment 100 includes a network 102, such as a local area network (LAN), a wide area network (WAN), a wireless network, the Internet, or a combination thereof. Network 102 connects websites 104, user devices 106, advertisers 108, and an advertisement management system 110. Environment 100 may include any number of websites 104, user devices 106, and advertisers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts.

A resource 105 is any data that can be provided over network 102. A resource 105 is identified by a resource address that is associated with resource 105, such as a URL. Resources 105 can include web pages, word processing documents, portable document format (PDF) documents, images, video, programming elements, interactive content, and feed sources, to name only a few. Resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages, such as, JavaScript® or ECMAScript®.

A user device 106 is an electronic device that is under control of a user and is capable of requesting and receiving resources 105 over network 102. Example user devices 106 include personal computers, mobile communication devices, and other devices that can send and receive data over network 102. In some implementations, user device 106 may includes a user application, such as a web browser, to facilitate the sending and receiving of data over network 102.

User device 106 can request resources 105 from a website 104. In turn, data representing resource 105 can be provided to user device 106 for presentation by user device 106 (e.g., on an electronic display, as an audible sound via a speaker, or a combination thereof). The data representing resource 105 can include data specifying a portion of the resource or a portion of a user display (e.g., a presentation location of a pop-up window or in a slot of a web page) in which advertisements can be presented. These specified portions of resource 105 or user display are referred to as advertisement slots.

To facilitate searching of the vast number of resources 105 accessible over network 102, environment 100 may include a search system 112 that identifies resources 105 by crawling and indexing resources 105 provided on websites 104. Data about resources 105 can be indexed based on resource 105 with which the data is associated. The indexed and, optionally, cached copies of resources 105 are stored in a search index (not shown).

User devices 106 can submit search queries to search system 112 over network 102. In response, search system 112 accesses the search index to identify resources 105 that are relevant to the search query. In one illustrative embodiment, a search query includes one or more keywords. Search system 112 identifies resources 105 that are responsive to the query, provides information about resources 105 in the form of search results and returns the search results to the user devices 106 in search results pages. A search result can include data generated by search system 112 that identifies a resource 105 that is responsive to a particular search query, and can include a link to resource 105. An example search result can include a web page title, a snippet of text or a portion of an image extracted from web page 104, a rendering of resource 105, and the URL of the web page 104. Search results pages can also include one or more advertisement slots in which advertisements can be presented.

A search result page can be sent with a request from search system 112 for the web browser of user device 106 to set an HTTP (HyperText Transfer Protocol) cookie. A cookie can represent, for example, a particular user device 106 and a particular web browser. For example, search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifier can be anonymized and is not connected with user names. Because HTTP is a stateless protocol, the use of cookies allows an external service, such as search system 112 or other system, to track particular actions and status of a user over multiple sessions. A user may opt out of tracking user actions, for example, by disabling cookies in the browser's settings.

When a resource 105 or search results are requested by a user device 106 or provided to user device 106, advertisement management system 110 receives a request for advertisements to be provided with resource 105 or search results. The request for advertisements can include characteristics of the advertisement slots that are defined for the requested resource 105 or search results page, and can be provided to advertisement management system 110. For example, a reference (e.g., URL) to resource 105 for which the advertisement slot is defined, a size of the advertisement slot, and/or media types that are available for presentation in the advertisement slot can be provided to advertisement management system 110. Similarly, keywords (i.e., one or more words that are associated with content) associated with a requested resource 105 ("resource keywords") or a search query for which search results are requested can also be provided to advertisement management system 110 to facilitate identification of advertisements that are relevant to resource 105 or search query.

Based on data included in the request for advertisements, advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries. In some implementations, advertisements having targeting keywords that match the resource keywords, the search query, or portions of the search query are selected as eligible advertisements by advertisement management system 110.

Advertisement management system 110 selects an eligible advertisement for each advertisement slot of a resource 105 or of a search results page. Resource 105 or search results page is received by user device 106 for presentation by user device 106. User interaction data representing user interactions with presented advertisements can be stored in a historical data store 119. For example, when an advertisement is presented to the user via an ad server 114, data can be stored in a log file 116. Log file 116, as more fully described below, can be aggregated with other data in historical data store 119. Accordingly, historical data store 119 contains data representing the advertisement impression. For example, the presentation of an advertisement is stored in response to a request for the advertisement that is presented. For example, the ad request can include data identifying a particular cookie, such that data identifying the cookie can be stored in association with data that identifies the advertisement(s) that were presented in response to the request. In some implementations, the data can be stored directly to historical data store 119.

Similarly, when a user selects to traverse a link (e.g., a hyperlink, a presented advertisement, etc.), data representing the selection of the link can be stored in log file 116, a cookie, or historical data store 119. In some implementations, the data is stored in response to a request for a web page that is linked to an advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 106. In further implementations, additional information may be collected about a particular user. For example, additional information may include information relating to the user's demographics, geographic location (e.g., based on a GPS function in a mobile device, based on an IP address, etc.), system information (e.g., which web browser is being use, the type of computing device used, etc.), and any other type of information about a user's interaction with environment 100.

Log files 116, or historical data store 119, also store references to advertisements and data representing conditions under which each advertisement was selected for presentation to a user. For example, historical data store 119 can store targeting keywords, bids, and other criteria with which eligible advertisements are selected for presentation. Additionally, historical data store 119 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation.

Advertisers 108 can submit, to advertisement management system 110, campaign parameters (e.g., targeting keywords and corresponding bids) that are used to control distribution of advertisements. Advertisers 108 can access advertisement management system 110 to monitor performance of the advertisements that are distributed using the campaign parameters. For example, an advertiser can access a campaign performance report that provides a number of impressions (i.e., presentations), selections (i.e., clicks), and conversions that have been identified for the advertisements. The campaign performance report can also provide a total cost, a cost-per-click, and other cost measures for the advertisement over a specified period of time.

In some implementations, when a user accesses a web page, or another resource, from a referring web page (or other resource), the referring web page (or other resource) for that interaction can be identified, for example, by execution of code that is referenced by the web page being accessed and/or based on a URL that is used to access the web page. For example, a user can access an advertiser's website by selecting a link presented on a web page, for example, as part of a promotional offer by an affiliate of the advertiser. This link can be associated with a URL that includes data (i.e., text) that uniquely identifies the resource from which the user is navigating. For example, the link http://www.example.com/homepage/%affiliate_identifier%promotion_1 specifies that the user navigated to the example.com web page from a web page of the affiliate that is associated with the affiliate identifier number that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to facilitate performance reporting and visualizing the flow of traffic in environment 100.

Advertisement management system 110 includes a performance analysis apparatus 120 that may use traffic and other data stored in logs 116, historical data 119, or elsewhere, to generate one or more flow visualizations of traffic in environment 100. For example, performance analysis apparatus 120 may analyze cookie data to determine how many users traverse from one of websites 104 to another. In some implementations, performance analysis apparatus 120 may aggregate sets of data into nodes and/or traffic paths for the visualization. Performance analysis apparatus 120 may also determine which nodes and traffic paths are displayed in a traffic flow visualization. For example, performance analysis apparatus 120 may utilize one or more scoring functions based on the amount of traffic between nodes to determine which traffic paths are displayed. The scoring function may also be based on level weights. For example, each of the traffic paths going from nodes A to B to C may have a level weight of 1, whereas a path that traverses directly from A to C may have a level weight of 2.

Figure 2:
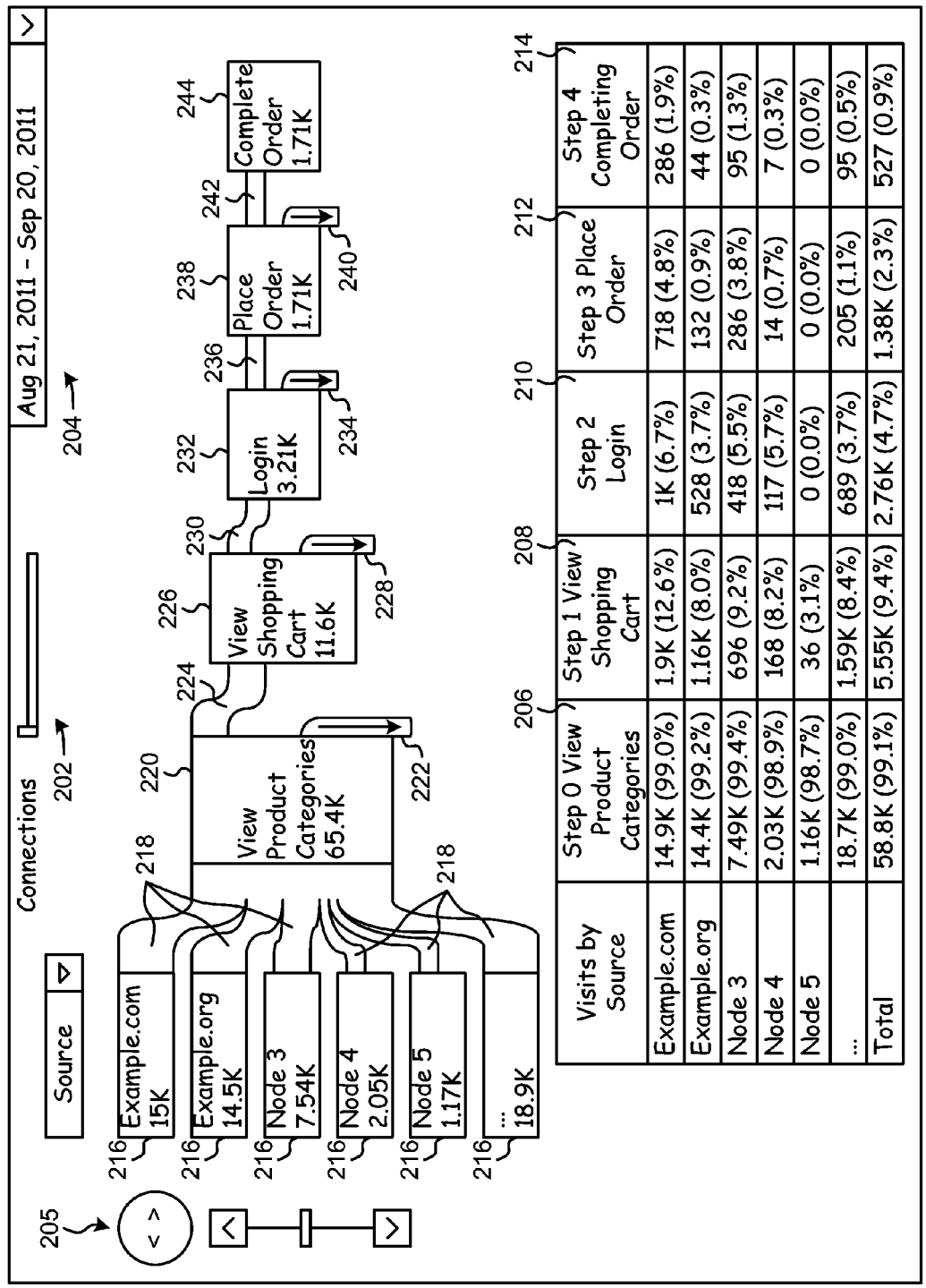
FIG. 2 is an illustration of an example visualization of online traffic.

FIG. 2 is an illustration of an example visualization 200 of online traffic. In general, visualization 200 displays a plurality of source nodes 216 (e.g., URL clusters, groups of demographics, groups of geographic locations, or any other grouping of information). For example, a first source node may be an aggregate of social networking sites while a second source node may be an aggregate of search engines. Some or all of source nodes 216 may also include a grouping of URLs for a particular website. For example, a particular website may include the following URLs:

http://www.example.com/home.html
http://www.example.com/search.aspx
http://www.example.com/
results.aspx?type=simple&q=test In such a case, visualization 200 may aggregate these URLs into a single source node 216 labeled "Example.com."

Visualization 200 may also include nodes that correspond to goals, according to some implementations. A goal may be a group of URLs that correspond to a certain action performed by users. For example, a first goal 206 may be to view product categories on a particular website or set of websites. Goal 206 may be used to generate a node 220, for example, by aggregating all URLs that display product information. A second goal 208 may be then to view a shopping cart, thereby indicating that a website visitor has added a product to their shopping cart. Goal 208 may be used to construct node 226. A third goal 210 may be for users to login to the website and used to construct a node 232. A fourth goal 212 may be for users to place an order and used to construct a node 238. Finally, a fifth goal 214 may be for users to complete their orders and utilized to construct a node 244.

Visualization 200 also displays traffic flow information between nodes. For example, traffic paths 218 represent the flow of traffic from source nodes 216 to node 220. In various implementations, visualization 200 may also provide indicia of the amount of traffic between nodes (e.g., by varying the appearance of traffic flows by traffic volume, by providing icons or text indicative of traffic volume, or by other ways of conveying the amount of traffic between nodes). For example, traffic paths 218 are shown to vary in size in visualization 200, thereby representing their different traffic volumes. Similarly, traffic paths 224, 230, 236, and 242 represent the flow of traffic from node 220 to 244 (e.g., through completion of a purchase) via nodes 226, 232, and 238. As shown, the decreasing size of traffic paths 224, 230, 236, and 242 in visualization 200 indicate that only a fraction of users that view products at node 220 actually complete a purchase at node 244.

Visualization 200 may also show drop-off traffic flows. In general, a drop-off traffic flow is one in which a user exits the process defined by goals 206, 208, 210, 212, and 214 (e.g., by stopping their web browsing session, by leaving to visit a different retailer's website, etc.). As shown, drop-off traffic paths 222, 228, 234, and 240 are attached to nodes 220, 226, 232, 238, respectively, to denote the flow of traffic away from each of these steps (e.g., that do not return to another node associated with a goal in visualization 200). In some implementations, drop-off traffic flows may include indicia that distinguishes them from other traffic flows (e.g., by applying a coloration, text or icon, etc.). For example, drop-off traffic path 222 may be colored red to denote the flow of traffic away from the product description pages of node 220 (e.g., by going to a competitor's website, by stopping the shopping process, etc.).

Visualization 200 is also shown to include time input 204, according to some implementations. Time input 204 is configured to receive a selection of a time or date for which visualization 200 is to be generated. For example, time input 204 may receive a selection of a date range that can be used to filter traffic information provided by visualization 200. By way of example, an advertiser may wish to view website traffic information around a certain holiday, to tailor an advertising campaign. In other implementations, time input 204 may be preset (e.g., the previous week, the previous month, a time period defined in a user's profile, etc.).

Visualization 200 may also include zoom input 205, which receives a selection of a zoom level. For example, a user of visualization 200 may use zoom input 205 to zoom out, thereby showing more nodes. Zoom input 205 may also be used to zoom in, thereby focusing the display of visualization 200 on only a subset of nodes. Zoom input 205 may be one or more icons, a sliding bar, or other selectable area of visualization 200.

In some implementations, visualization 200 may include a connection selector 202. Connection selector 202 receives a selection of an amount of traffic flows to be displayed on visualization 200. As shown, connection selector 202 is set to display only a minimal amount of traffic flows on visualization 200. Connection selector 202 may be an input field that receives a number of flows to display, one or more icons (e.g., an up and down arrow), a slide bar, or any other selectable area for receiving a selection on visualization 200.

Figure 3:
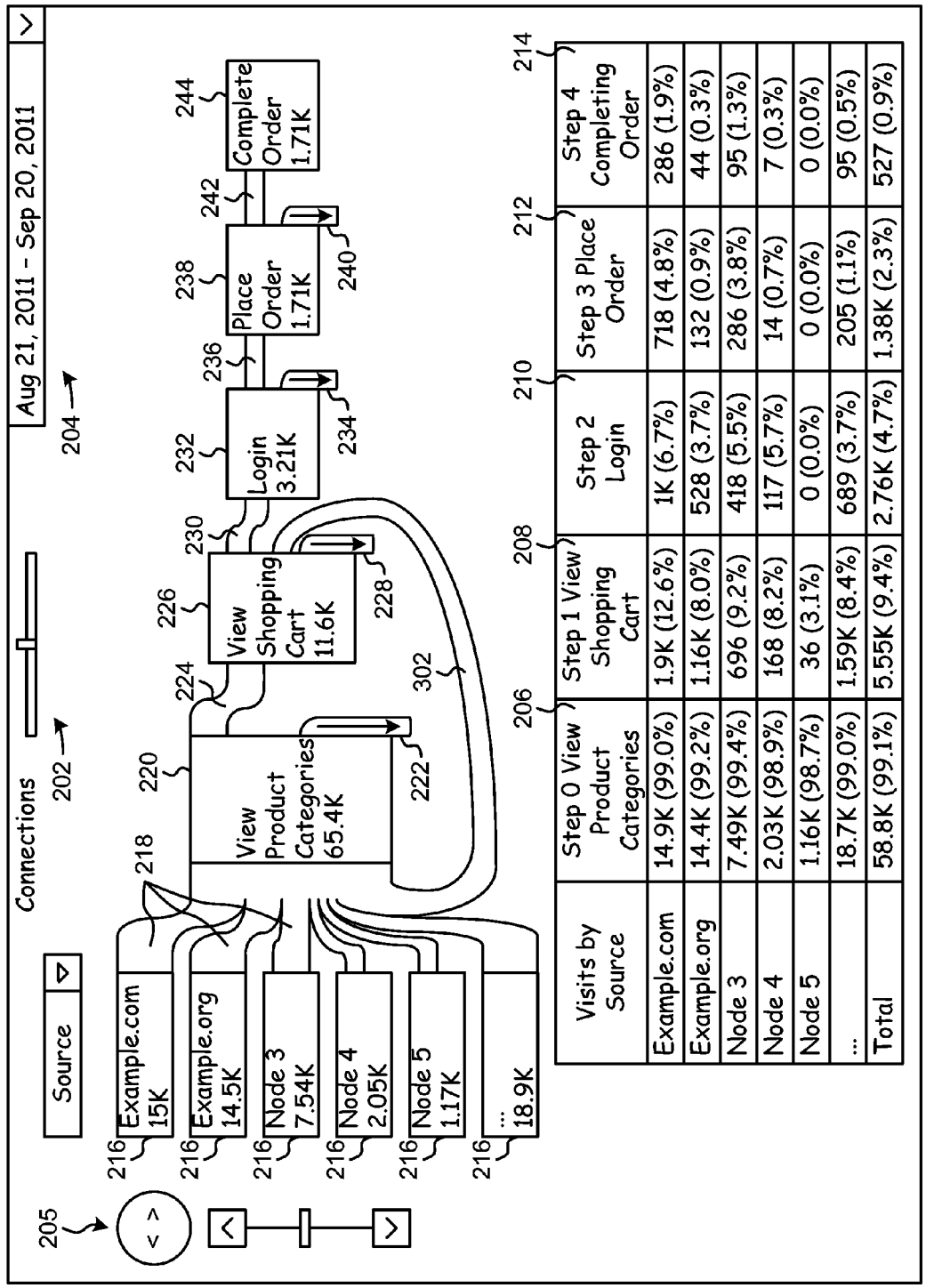
FIG. 3 is an illustration of an example visualization of online traffic showing more traffic flow connections.

FIG. 3 is an illustration of an example visualization 300, showing more traffic flow connections than that of visualization 200. Visualization 300 displays all of the same information as that of visualization 200, except that connection selector 202 has been adjusted in visualization 300 to display more traffic flow connections than that of visualization 200. In particular, traffic path 302 may be displayed in visualization 300 when connection selector 202 receives a command to increase the number of displayed traffic connections.

Traffic path 302 differs from that of the traffic flows in visualization 200 in that it denotes a backwards path. For example, traffic path 302 may signify that a number of users return to view details about a second product, after adding a first product to their shopping carts (e.g., a user opts to continue shopping, instead of completing an order). This information may be pertinent to a user of visualization 300, in certain situations. For example, an online merchant may run a promotion where shipping is free when the total purchase price of an order is over a certain limit. Traffic path 302 allows the merchant to analyze how effective the promotion is at prompting customers to increase their orders.

In some implementations, a scoring function may be used to control which traffic flows are displayed in visualization 300. In some cases, a scoring function may be based in part on the volume of traffic over a particular traffic flow and/or a level weight. For example, one implementation may utilize a scoring function defined as follows:

$$f(e) = w_{traffic}(e) * w_{length}(e)$$

where e is a traffic flow between two nodes, $w_{traffic}(e)$ is a traffic weight factor based on the amount of traffic over e, and $w_{length}(e)$ is a length weight factor based on the number of levels traversed by e in visualization 200. For example, data flow 224 may have a higher traffic weight factor than that of data flow 242, since more users add items to their shopping carts than actually complete their purchases.

A length weight factor may be defined to give greater priority to displaying certain traffic flows over others in visualization 300. In some implementations, traffic flows that connect nodes from one level to the next along the levels of goals 206, 208, 210, 212, and 214 may be given the highest length weight factors. Therefore, traffic flows that follow the steps defined by goals 206, 208, 210, 212, and 214 may be displayed over other types of traffic flows. Traffic flows in the negative direction may be given lower length weight factors, to reduce the number of backwards paths that may be displayed. For example, traffic path 302 may have a length of −1, since traffic flowing in this direction moves away from the overall goal of a completed purchase, i.e., goal 214. Traffic flows that also skip levels ("skips") may be given other length weight factors. For example, traffic flowing from a source node 216 directly to node 232 may have a length of three and weight of ⅓, since it skips over two levels.

According to various implementations, the traffic weight factor for a particular traffic flow may be high enough to offset a lower length weight factor. For example, traffic path 302 may have a lower length weight factor than that of traffic path 224, since it flows in the opposite direction. However, the amount of traffic flowing back from node 226 to node 220 may be great enough to cause traffic path 302 to be displayed. Other backwards paths that have less traffic may still be concealed from display, depending on the level of detail defined by connection selector 202. For example, a flow of traffic from node 232 to 226 may be concealed while traffic path 302 is displayed, since traffic path 302 has a much larger volume of traffic.

Figure 4:
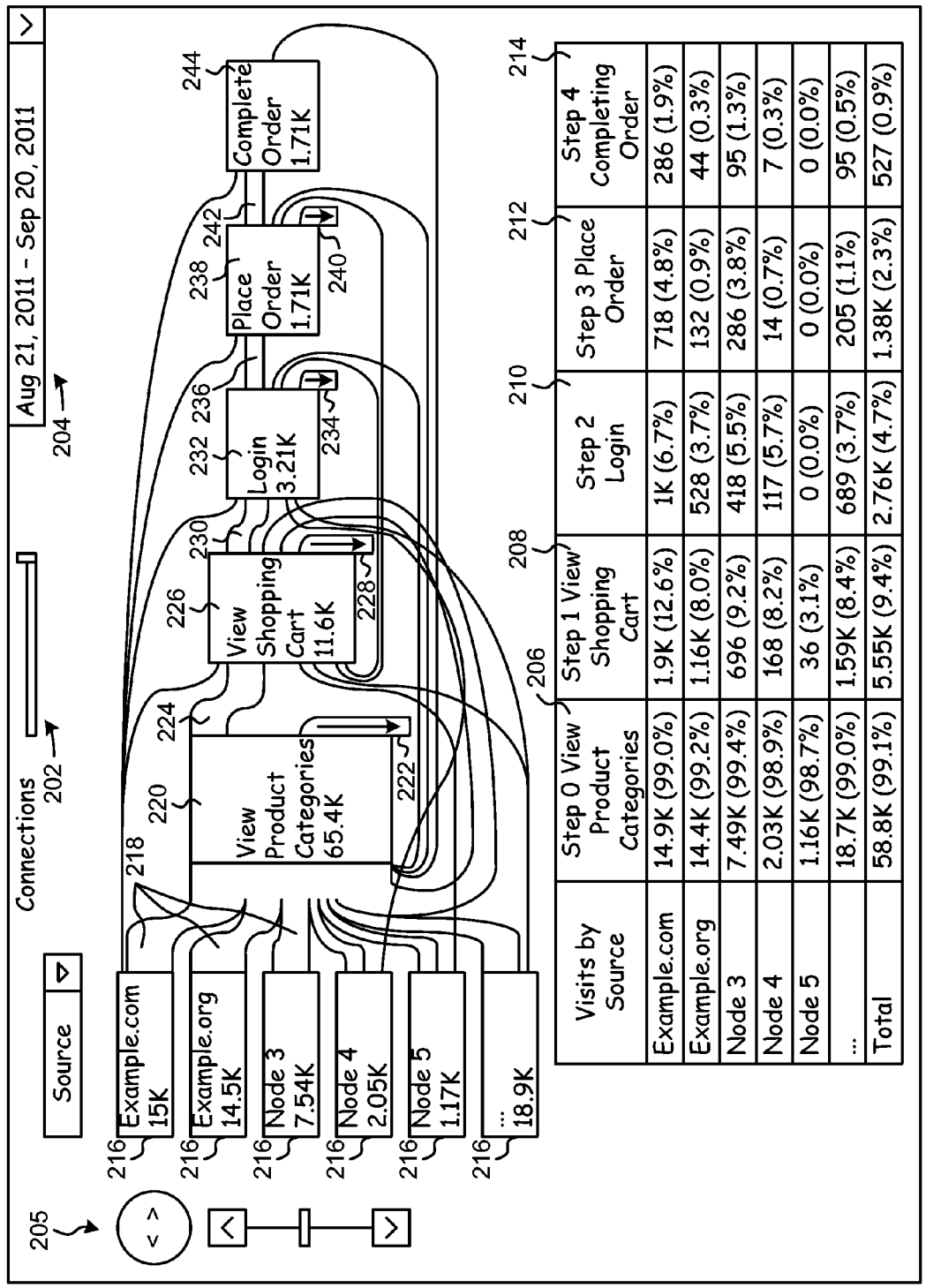
FIG. 4 is an illustration of an example visualization of online traffic showing even more traffic flow connections.

FIG. 4 is an illustration of an example visualization 400, showing more traffic flow connections than that of visualization 300 in FIG. 3. Visualization 400 displays all of the same information as that of visualizations 200 and 300, except that connection selector 202 has been adjusted in visualization 400 to display all traffic paths over which traffic flows between the nodes of visualization 400. For example, backwards paths and skips may be shown in visualization 400, even though they may have only a small volume of traffic. While only three settings of connection selector 202 are shown in FIGS. 2-4, any number of different settings may be used to vary the number of displayed traffic flows.

Figure 5:
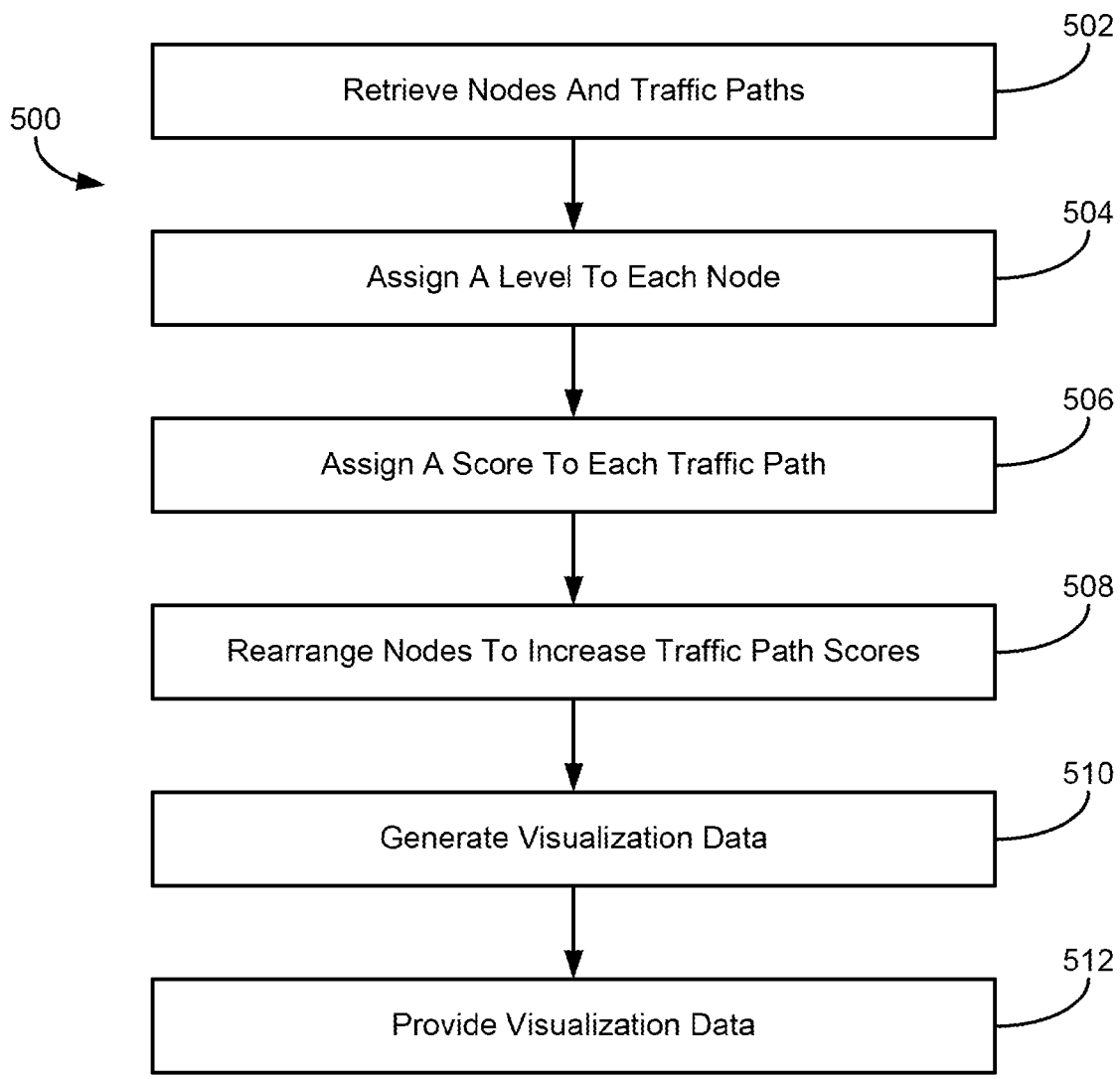
FIG. 5 is a flow diagram of an example process for generating a visualization of online traffic.

FIG. 5 is a flow diagram of an example process 500 to display network traffic data. In some implementations, process 500 may be performed by a server that aggregates network traffic data (e.g., performance analysis apparatus 120 in FIG. 1, etc.). For example, a server may utilize process 500 to generate a visualization of the network traffic and provide visualization data to a user device. In other implementations, the network traffic data may first be downloaded to a user device that utilizes process 500 to analyze the traffic data (e.g., using one or more scripts, programs, or other routines running on the user device).

Process 500 may include retrieving nodes and traffic paths from a memory device (block 502). In general, nodes may be any grouping of data related to the network. For example, nodes may be clusters of websites, URLs, servers, or other groups of content sources in the network. Nodes may also be based on geographic location information, demographic information, system configuration information (e.g., the hardware and/or software used to access a content source), or other information. In some implementations, nodes may be grouped based on a plurality of factors. For example, a node may be based on both geographic information and system configuration information. Traffic paths connect nodes and represent a grouping of network traffic between nodes. For example, one node may be a cluster of URLs for www.example.com and a second node may be a cluster of URLs for www.example.org. In such a case, a traffic path may connect node one to node two and a second traffic path may connect node two to node one.

Process 500 may include assigning a level to each node (block 504). In general, a level correspond to the separation between nodes. For example, traffic that passes from nodes A to B to C traverses two levels, since it flows through two traffic paths: A to B and then from B to C. In such a case, node A may be assigned level 1, node B may be assigned to level 2, and node C may be assigned level 3. In some implementations, a start level may be predetermined. For example, a parameter may be used to select which nodes are to be start nodes in the visualization. In such a case, these nodes may be assigned the lowest level and other nodes assigned a level based on their positions relative to the start node.

Process 500 may include assigning a score to each traffic path (block 506). In general, a score may be based on the volume of traffic along a path. A score may also be based on other factors, to establish which types of traffic paths are given priority for the visualization. For example, a length weight may be used as part of the score to give preference to visualizing certain types of path over others. Types of paths may include forward paths that traverse a level, forward paths that skip levels, and backward paths that loop back to a lower level. The length weight may also vary by the number of levels traversed by the path. For example, a traffic path that skips a single level (e.g., a traffic path of length +2) may have a higher length weight than that of a traffic path that skips three levels (e.g., a traffic path of length +4). In this way, lower scored traffic paths may be excluded from a visualization, thereby displaying the most relevant flows of traffic in the network.

Process 500 may include rearranging nodes to increase the sum of traffic path scores (block 508). In general, an overall score may be maintained by summing the scores of all traffic paths in the current arrangement of nodes. As nodes are rearranged to different levels, the scores of their associated traffic paths may also change. For example, node A my be at level 1 and node B may be at level 3. A traffic path that connects the two nodes may have an increased score, if node B is rearranged to level 2, since the distance between nodes A and B decreases. This rearrangement may be repeated, so long as the overall score increases. In one implementation, a hill-climbing algorithm may be used to optimize the overall score of the traffic paths. In other implementations, different optimization strategies may be used. In some implementations, the rearrangement of nodes may be stopped before reaching an optimal solution. For example, the number of times the nodes are rearranged may be limited to a certain amount.

Process 500 may include generating visualization data (block 510). The visualization data includes at least two nodes and one or more traffic paths, based on the arrangement of nodes that increase the sum of traffic path scores. The nodes in the visualization data may be unique, i.e., each node is displayed only once in a visualization. The visualization may also include indicia of traffic that does not go to a node displayed in the visualization (e.g., flows of traffic that "drop off" from the process). One or more connection parameters may also be used to generate the visualization data. For example, a connection parameter may indicate an amount of traffic paths to be displayed in the visualization. In such a case, the traffic paths having the highest scores may be included in the visualization data, until the amount specified by the connection parameter is met.

Process 500 may include providing the visualization data to an electronic device (block 512). In some implementations, the electronic device may be one or more electronic displays. For example, a user device that processes received network traffic data may provide the visualization data directly to an electronic display. In other implementations, the visualization data may be generated by a server or other remote device and provided to a user device. The user device, in turn, may use the visualization data to cause an electronic display to display the visualization. For example, the visualization data may be generated by a server and provided to a user's computer, which then uses the visualization data to display the visualization data on a monitor.

Figure 6:
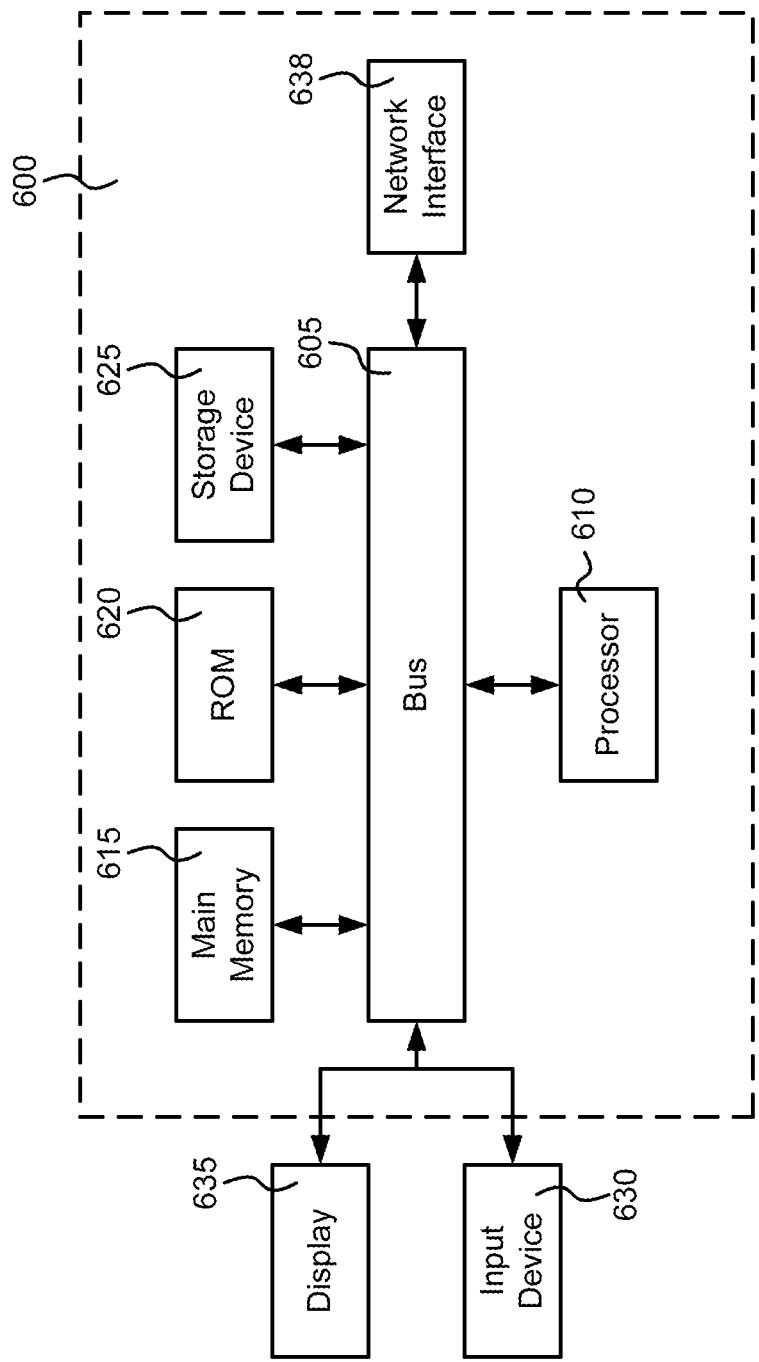
FIG. 6 is a block diagram of an example processing circuit in accordance with an illustrative implementation.

FIG. 6 is a block diagram of an example processing circuit 600 configured to generate visualization data using network traffic information. Processing circuit 600 may be part of a server (e.g., performance analysis apparatus 120 in FIG. 1 or another computing device), part of a user device (e.g., a mobile device, a desktop computer, or any other computing device), or part of any other electronic device. Processing circuit 600 includes a bus 605 or other communication mechanism for communicating information and a processor 610 coupled to bus 605 for processing information. The processing circuit 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The processing circuit 600 may further include a read only memory (ROM) 610 or other static storage device coupled to the bus 605 for storing static information and instructions for the processor 610. A storage device 625, such as a solid state device, magnetic disk, optical disk, non-transitory memory, or the like, is coupled to the bus 605 for persistently storing information and instructions.

Processing circuit 600 may be coupled via bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another embodiment, the input device 630 has a touch screen display 635. The input device 630 can include a cursor control, such as a mouse, a trackball, or cursor direction keys, for communicating direction information and command selections to the processor 610 and for controlling cursor movement on the display 635. Processing circuit 600 may also include network interface 638. Network interface 638 is configured to receive and transmit data over a data network. For example, network interface 638 may include an Ethernet port, a wireless transceiver, a telephone port, or any other type of data network interface.

According to various implementations, the processes that effectuate illustrative embodiments that are described herein can be implemented by processing circuit 600 in response to the processor 610 executing an arrangement of instructions contained in main memory 615 and/or storage device 625. Such instructions can be read into main memory 615 from another computer-readable medium, such as the storage device 625 or received via network interface 638. Execution of the arrangement of instructions contained in main memory 615 causes the processing circuit 600 to perform the illustrative processes described herein. One or more processors in a multi-processing arrangement may also be employed to execute the instructions contained in main memory 615. In alternative embodiments, hard-wired circuitry may be used in place of or in combination with software instructions to implement illustrative embodiments. Thus, embodiments are not limited to any specific combination of hardware circuitry and software.

In one example, pseudocode for the instructions is as follows:

```
Input:
    G       // G is a directed graph having nodes {n} and paths {e}
    F       // F is a scoring function that scores a path e_i
Output:
    G_arranged // G_arranged is an arrangement of G that maximizes Σ F(e_i)
Layout(G,F)
{
    startNodes = nodes in G with the fewest incoming weights;
    startNotes.level = 0;
    improved = true;
    WHILE improved
        improved = false;
        FOR each node in G
            IF node.level = x improves sum(F(e_i))
                node.level = x
                improved = true
            ENDIF
        END FOR
    END WHILE
    return(G);
}
```

As shown in the above pseudocode, the scoring function may be used to control the priority of displayed paths. For example, the scoring function may be defined as follows:

$$F(e_i) = w_{length}(e_i) * w_{traffic}(e_i)$$

where $w_{length}$ is start a weight assigned to path $e_i$ based on the level difference between its start and end nodes, and $w_{traffic}$ is a weight assigned to path $e_i$ based on the volume of traffic along the path. Other scoring function may also be used, to emphasize or deemphasize certain traffic paths.

Although an example processing circuit has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the disclosure or of what may be claimed, but rather as descriptions of features specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of generating data indicative of Internet traffic data, comprising:
    accessing data representative of a plurality of nodes and traffic paths between nodes;
    determining a first level for each node of the plurality of nodes, the first level representing a position of the each node relative to a start node;
    calculating, by a processing circuit, a first score for each traffic path by multiplying a traffic volume weight factor based on traffic along the each traffic path and a level weight factor based on a number of levels difference between a traffic path start node and a traffic path end node connected by each traffic path, the level difference based on the determined first levels for each of the plurality of nodes;
    determining, by the processing circuit, an arrangement for the plurality of nodes, wherein determining the arrangement comprises:
        calculating a first aggregate score for a first arrangement of the plurality of nodes based on the calculated first scores,
        modifying the first level for a node of the plurality of nodes to be a second level for the node of the plurality of nodes,
        calculating a second score for each traffic path by multiplying the traffic volume weight factor of each traffic path and a second level difference between the traffic path start node and the traffic path end node connected by the traffic path based on the second level for the node of the plurality of nodes,
        calculating a second aggregate score for a second arrangement of the plurality of nodes based on the calculated second scores,
        comparing the first aggregate score to the second aggregate score, and
        selecting the second arrangement responsive to the second aggregate score exceeding the first aggregate score;
    generating visualization data configured to cause an electronic display to display two or more of the nodes and one or more traffic paths between the displayed two or more nodes according to the second arrangement; and
    providing the visualization data to an electronic device.

2. The method of claim 1, wherein a node of the plurality of nodes comprises a cluster of URLs.

3. The method of claim 1, wherein each node is displayed only once in the display.

4. The method of claim 1, further comprising:
    receiving a connections parameter indicative of an amount of traffic paths to display, wherein the visualization data is generated based in part on the connections parameter.

5. The method of claim 1, further comprising:
    receiving a nodes parameter indicative of an amount of nodes to display, wherein the visualization data is generated based in part on the nodes parameter.

6. The method of claim 1, wherein the visualization data comprises indicia of traffic that does not go to a displayed node.

7. The method of claim 1, wherein the first level or the second level corresponds to a step in an online process.

8. The method of claim 1, wherein the one or more displayed traffic paths comprise indicia of the traffic volume along the one or more displayed traffic paths.

9. The method of claim 1, wherein a displayed traffic path comprises a backwards path.

10. A system for generating data indicative of network traffic comprising:
    a processing circuit configured to:
        access data representative of a plurality of nodes and traffic paths between nodes,
        determine a first level for each node of the plurality of nodes, the first level representing a position of the each node relative to a start node,
        calculate a first score for each traffic path by multiplying a traffic volume weight factor based on traffic along the each traffic path and a level weight factor based on a number of levels difference between a traffic path start node and a traffic path end node connected by each traffic path, the level difference based on determined first levels for each of the plurality of nodes
        determine an arrangement for the plurality of nodes, wherein determining the arrangement comprises:
            calculating a first aggregate score for a first arrangement of the plurality of nodes based on the calculated first scores,
            modifying the first level for a node of the plurality of nodes to be a second level for the node of the plurality of nodes,
            calculating a second score for each traffic path by multiplying the traffic volume weight factor of each traffic path and a second level difference between the traffic path start node and the traffic path end node connected by the traffic path based on the second level for the node of the plurality of nodes, calculating a second aggregate score for a second arrangement of the plurality of nodes based on the calculated second scores, comparing the first aggregate score to the second aggregate score, and selecting the second arrangement responsive to the second aggregate score exceeding the first aggregate score, generate visualization data configured to cause an electronic display to display two or more of the nodes and one or more traffic paths between the displayed two or more nodes according to the second arrangement, and provide the visualization data to an electronic device.

11. The system of claim 10, wherein a node of the plurality of nodes comprises a cluster of URLs.

12. The system of claim 10, wherein each node is displayed only once in the display.

13. The system of claim 10, wherein the processing circuit is further configured to receive a connections parameter indicative of an amount of traffic paths to display, wherein the visualization data is generated based in part on the connections parameter.

14. The system of claim 10, wherein the processing circuit is configured to receive a nodes parameter indicative of an amount of nodes to display, wherein the visualization data is generated based in part on the nodes parameter.

15. The system of claim 10, wherein the visualization data comprises indicia of traffic that does not go to a displayed node.

16. The system of claim 10, wherein a displayed traffic path comprises a backwards path.

17. The system claim 10, wherein the one or more displayed traffic paths comprise indicia of the traffic volume along the one or more displayed traffic paths.

18. The system of claim 10, wherein the first level or the second level corresponds to a step in an online process.

19. One or more non-transitory computer-readable media having instructions stored therein, the instructions being executable by one or more processors to cause the one or more processors to perform operations comprising:

accessing data representative of a plurality of nodes and traffic paths between nodes;

determining a first level for each node of the plurality of nodes, the first level representing a position of the each node relative to a start node;

calculating a first score for each traffic path by multiplying a traffic volume weight factor based on traffic along the each traffic path and a level weight factor based on a number of levels difference between a traffic path start node and a traffic path end node connected by each traffic path, the level difference based on the determined first levels for each of the plurality of nodes;

determining an arrangement for the plurality of nodes, wherein determining the arrangement comprises:

calculating a first aggregate score for a first arrangement of the plurality of nodes based on the calculated first scores, modifying the first level for a node of the plurality of nodes to be a second level for the node of the plurality of nodes, calculating a second score for each traffic path based in part on the traffic volume along the by multiplying the traffic volume weight factor of each traffic path and a second level difference between the traffic path start node and the traffic path end node connected by the traffic path based on the second level for the node of the plurality of nodes, calculating a second aggregate score for a second arrangement of the plurality of nodes based on the calculated second scores, comparing the first aggregate score to the second aggregate score, and selecting the second arrangement responsive to the second aggregate score exceeding the first aggregate score;

generating visualization data configured to cause an electronic display to display two or more of the nodes and one or more traffic paths between the displayed two or more nodes according to the second arrangement; and providing the visualization data to an electronic device.

20. The one or more non-transitory computer-readable media of claim 19, wherein a node of the plurality of nodes comprises a cluster of URLs.

* * * * *